June 11, 1963  C. A. RICH, JR  3,093,425
SEAL FOR ROLLING MILL
Filed Nov. 30, 1961
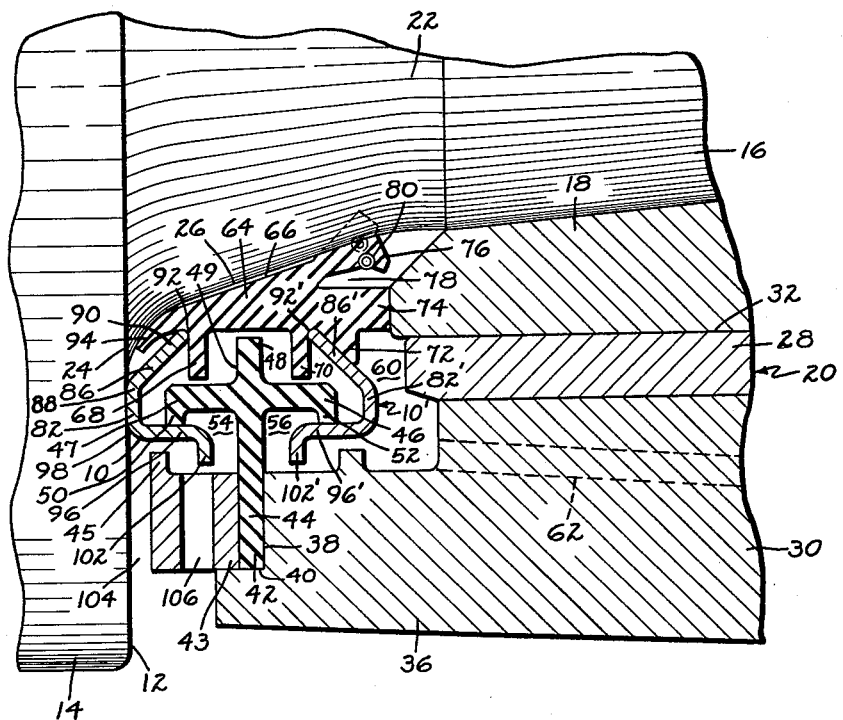
INVENTOR.
Charles A. Rich Jr.
BY
Russell, Chittick + Pfund
Attorneys

United States Patent Office 3,093,425
Patented June 11, 1963

3,093,425
SEAL FOR ROLLING MILL
Charles A. Rich, Jr., Worcester, Mass., assignor to Morgan Construction Company, Worcester, Mass., a corporation of Massachusetts
Filed Nov. 30, 1961, Ser. No. 155,941
7 Claims. (Cl. 308—36.1)

This invention relates generally to sealing devices and specifically to inner seal rings adapted for use adjacent the end surface of a roll utilized in rolling mill operations.

It is the normal procedure in rolling steel bars and the like in rolling mills to have a continuous supply of water directed on the rolls for cooling and carrying away scale and impurities which form on the stock during the rolling operation. Since the roll necks of the rolls are customarily supported in flooded oil film type bearings, every precaution must also be taken to prevent the impurity-laden cooling water from commingling with the oil. Small quantities of the water alone, upon mixing with the oil, will result in emulsification, reducing the thickness of the oil film supporting the roll neck and allowing overheating and scoring of the relatively moving bearing surfaces. The mixture of scale and water, if allowed to come into contact with the bearing surfaces, can also cause serious damage, resulting in an expensive and time-consuming shutdown.

Various attempts have been made in the industry to provide an efficient seal for this purpose, and in one particular construction an annular ring concentric with the roll axis is mounted on a fixed portion of the bearing. The ring has a plastic or lead alloy face which is in frictional engagement with the roll face. While the construction was an improvement over the prior art, it had several serious drawbacks, such as too rapid wear of the engaging surfaces, impairing the efficiency of the seal as well as causing scoring of the roll face by abrasive particles trapped between the ring face and the end of the roll. Furthermore, considerable shutdown time is involved in the periodic replacement of the worn seal.

This invention constitutes an improved type of inner ring seal used in conjunction with a roll neck seal of the type shown in my Patent 2,868,574 granted January 13, 1959.

It is, therefore, an object of this invention to provide an improved construction of an inner ring seal located between the roll face and bearing which is highly efficient in excluding impurities and water from the bearing surfaces and from the area at the roll end of the bearing into which the bearing oil is discharged.

A further object of this invention is to provide an inner seal ring having a portion in cooperative engagement with the roll neck seal to offset centrifugal force tending to lift the flexible neck seal away from the roll neck.

Another object of this invention is to provide one or more water sealing rings which are substantially immune to frictional wear and can endure long periods of use before being replaced.

Another object of this invention is to provide a water sealing unit which can be simply and easily installed simultaneously with the application of the bearing to the roll neck and, conversely, which will be removed when the bearing is removed from the roll neck.

Other objects of this invention will become more apparent as the description proceeds with the aid of the accompanying drawing in which:

The single FIGURE is a view in sectional elevation of part of the bearing portion of a cylinder roll with the seal interposed between the bearing and the roll.

In the drawing, there is illustrated a first water inner seal ring indicated generally at 10 and resting against an end face 12 of a roll 14 having the roll neck 16 on which is mounted a sleeve 18 riding in a bearing 20. The roll neck 16 is spaced from the roll 14 by a portion 22 which is joined to the end face 12 of roll 14 by a fillet 24 defining a conical intermediate section 26. The bearing 20 is of the flooded oil film type and includes the sleeve 18 disposed within a bushing 28 supported by a chock 30. The chock 30 and bushing 28 are locked together to remain stationary during rotation of the sleeve 18 and roll neck 16, with the sleeve being supported on an oil film at 32 which is forced under pressure between the sleeve 18 and the bushing 28.

The chock 30 has a portion 36 extending laterally in the direction of the roll 14. At the end 38 of the portion 36, a watertight joint 40 is effected with a seal end plate 42 made of somewhat flexible material, such as rubber or neoprene. An outer seal ring 43, having an inwardly extending circular flange 45, is bolted to portion 36 and holds plate 42 tightly against end 38. An intermediate annular section 44 of the seal end plate 42 extends inwardly substantially normal to the axis of the roll 14. From section 44 extend two cylindrical oppositely disposed flanges 46 and 47. These flanges together with the inward extension 48 form a T-ring 49. The T-ring 49 includes a pair of radial flanges 50 and 52 extending outwardly away from the annular flanges 46 and 47 and laterally spaced from the main section, thus defining areas 54 and 56.

A second inner seal ring indicated generally at 10' is disposed on the opposite side of the T-ring 49. Seal rings 10 and 10' are similar in construction but of reversed pattern and have their inner edges resting against a resilient annular neck seal 64. The chamber 60, which is enclosed by the sleeve 18, bushing 28, chock 30, seal ring 10' and annular section 44, acts an an intermediate storage area for the oil which passes between the sleeve and the bushing and drains through the port 62 into the main sump (not shown).

The resilient annular neck seal 64 having tapered surfaces 66 is fitted into engagement with the conical intermediate section 26 of the roll neck 22. Outwardly extending radial flanges 68 and 70 are closely adjacent the flanges 46 and 47. An angularly extending flinger flange 72 locates the inner edge of seal ring 10' against the inner end of flange 70. An extension 74 of the neck seal 64 is positioned in abutting relationship with the sleeve 18. A portion 76 of the neck seal 64 is separated from the main body thereof by a channel 78 and contains a peripheral coil spring member 80 which acts to bias the seal tightly against the intermediate section 26.

Both water inner seal rings 10 and 10' are formed of a fairly rigid material, such as spun aluminum. Ring 10 consists of an annular part 82 which rests snugly against the end face 12 of the roll 14.

A conical portion 86 of the seal ring 10 bends away from part 82 at 88 so that the terminal end 90 is positioned in supporting engagement with the inner edge of a bight 92 formed by the flange 68 and an extension 94 of the seal 64. The portion 96 of the seal ring 10 has a right angular bend at 98 positioning the portion 96 normal to the roll end face 12 between the terminal end of the flange 50 and the inwardly extending leg 45 of the ring 43. A short flange 102 extends outwardly from the portion 96 so as to lie parallel with the annular part 82 and is disposed within the area 54. Similarly, the seal ring 10' comprises an annular part 82', a conical portion 86', a cylindrical part 96' and a short flange 102'.

The outer surfaces of flanges 50 and 52 ride lightly against but in watertight engagement with the inner rotating surfaces of cylindrical parts 96 and 96' of rings 10 and 10' respectively. Since all of the parts heretofore described are concentric, it is obvious that liquid-tight seals are provided at 92 and 92' between portions 86 and 86' of seal rings 10 and 10' and the corresponding engaged areas of neck seal 64. Furthermore, the engagement of rotating parts 96 and 96' of the seal rings 10 and 10' with the stationary flanges 50 and 52 provides effective liquid seals at these positions. Neck seal 64 fits tightly on tapered neck 26 to preclude passage of water therebetween. Thus it becomes impossible for water entering the space 104 between the end of the roll 12 and ring 43 to reach either the area 56 or the area 60 in which oil is present. Any water getting into area 54 will be flung outwardly by centrifugal force from flange 102 to drain out through bottom opening 106 in ring 43.

The method of assembling and installing the mechanism is as follows: The conical flange 86' of ring 10' is positioned within the bight 92' of neck seal 64. This is possible because of the flexible nature of the neck seal. The end plate 42 is then positioned as shown, with the inner extension 48 located between the radial flanges 68 and 70 of the neck seal. The other seal ring 10 is then positioned so that the conical portion 86 has its end located in bight 92. This assembly is then located on the end of the bearing assembly prior to the application of the bearing assembly to the roll neck 16. That is to say, the extension 74 of neck seal 64 is positioned against the end of sleeve 18 and the end plate 42 is positioned against the end surface 38. Then the outer seal ring 43 is placed against the end plate 42 and suitable bolts are introduced so that the outer seal ring 43 clamps the end plate 42 in fixed position with respect to the bearing.

With the parts thus assembled, the entire bearing unit, including the sealing elements, is positioned on the roll neck 16. When the bearing is forced to final position as shown, the neck seal will be in tight engagement with the conical part 26 of the roll neck and the leading annular surface of the seal ring 10 will be in engagement with the face 12 of roll 14.

When the bearing is removed from the roll neck, it is apparent that it will carry with it all of the sealing elements. This comes about because the flange 45 on moving to the right will engage flange 102 of seal ring 10 to move to the right. This in turn compels the neck seal 64 to leave its watertight position on conical part 26. Once the bearing has been removed from the roll neck, the sealing elements can be removed for replacement, repair or use with another bearing.

It will be further observed that when the neck seal 64 has been forced to its final position by the movement to the left of sleeve 18, the flexible material of which the neck seal is made will be in a compressed condition between the conical portion 26 of the roll neck and the inner ends of flanges 86 and 86'. This insures tightness at all critical areas regardless of the speed of rotation of the roll.

It is my intention to claim all modifications and changes of the preferred embodiment of my invention herein chosen for purposes of disclosure which do not constitute departures from the spirit and scope of the invention.

I claim:

1. A seal for use with a rotatable roll having a roll neck and an end face, said seal including a series of integral substantially rigid annular flanges, a first flange adapted to engage and rotate with the end face of said roll in co-planar relation thereto, a second flange extending angularly away from said first flange in the direction of the axis of rotation, a circular neck seal fitting tightly between said roll neck and the said second flange, a third flange outside of said second flange extending normal to the first flange and having its terminal end directed away from the axis of rotation, and a stationary circular flange of flexible material engaging the interior surface of said third flange.

2. Sealing means for use adjacent the end face of a rotatable roll comprising in combination a conical roll neck having an annular resilient neck seal in frictional engagement therewith and disposed between a bearing and said end face, and a multi-flanged annular baffle member, said baffle member having a first flange in fixed co-planar relation to said end face, a second flange integral with said first flange and extending angularly away from said end face in the direction of the axis of rotation, the peripheral rim of said second flange positioned within a groove on said neck seal, a third flange extending normal to said first flange with its terminal end extending away from the axis of rotation, and other circular non-rotating means engaging the interior of said third flange in watertight sliding engagement.

3. Sealing means for use with a rotatable roll and a bearing therefor including in combination a conical portion disposed between a roll neck and an end face of said roll, an annular resilient neck seal frictionally engaging said portion and a multi-flanged annular baffle member rotating with said roll and comprising a first flange coplanar to and engaging said end face, a second flange integral with said first flange extending angularly away from said end face with its peripheral rim in engagement with said neck seal, a third flange integral with said first flange and exterior of said second flange, and circular means fixed to said bearing slidingly engaging the interior of said third flange.

4. Sealing means for use on the roll neck of a roll for preventing the passage of water to the bearing area, said means comprising a neck seal positioned on the roll neck, a seal ring having an annular area engaging the face of said roll and having its inner edge in watertight engagement with said neck seal, a cylindrical flange on said seal ring extending away from said annular area, and a flange of flexible material attached to the stationary part of the bearing and engaging the inner face of said cylindrical flange in sliding watertight relationship.

5. Sealing means for use on the roll neck of a roll for preventing the passage of water to the bearing area, said means comprising a neck seal positioned on the roll neck, a seal ring having an annular portion engaging the face of said roll and having its inner edge in watertight engagement with said neck seal, a cylindrical flange on said seal ring extending away from said annular portion, a flange of flexible material attached to a stationary part of the bearing and engaging the inner face of said cylindrical flange in sliding watertight relationship, a second seal ring of reverse but similar configuration to the said first seal ring, the inner edge of said second seal ring being in watertight engagement with said neck seal, and a second flange fixed with respect to said bearing in sliding and watertight engagement with the interior surface of cylindrical flange of said second seal ring.

6. In a rolling mill, a roll having a roll neck and a bearing carrying said roll neck, said bearing being of the type utilizing a film of oil under pressure, means for preventing cooling water from reaching the oil being discharged from said bearing at the roll end thereof during operation of the roll, said means comprising a circular neck seal residing on the roll neck adjacent the roll end, said neck seal being in engagement about its outer end circumference with the rotating part of said bearing, an end plate of flexible material mounted on the end of the stationary part of said bearing and surrounding but spaced from said neck seal, said end plate including a pair of axially spaced radial flanges, a pair of seal rings mounted on said neck seal in axial spaced relation, said seal rings including cylindrical flanges facing each other and of such dimension that the interior surfaces of said cylindrical flanges will be in sliding engagement with the spaced radial flanges of the said end plate.

7. Sealing means for use with the roll of a rolling mill in which said roll has a roll neck, a bearing supporting said roll neck, and a conical portion between the roll neck and the roll, said means comprising a neck seal fitting tightly about said conical portion, a circular element attached in fixed relation to the end of the stationary part of the roll neck supporting bearing, said fixed circular element having oppositely extending circular flanges, a pair of circular sealing elements fixed in watertight relation with respect to said neck seal, said circular sealing elements having cylindrical portions extending toward each other and radially outside of said opositely extending circular flanges, the said cylindrical portions having their interior faces in sliding watertight engagement with the said oppositely extending circular flanges whereby, during rotation of said roll, water is prevented from reaching the inner end of said bearing.

References Cited in the file of this patent

UNITED STATES PATENTS

| | | |
|---|---|---|
| 2,851,315 | Zavoda | Sept. 9, 1959 |
| 2,868,574 | Rich | Jan. 13 1959 |

FOREIGN PATENTS

| | | |
|---|---|---|
| 1,168,769 | France | Sept. 1, 1958 |